United States Patent [19]

Oberg

[11] Patent Number: 4,524,515
[45] Date of Patent: Jun. 25, 1985

[54] ROTARY CUTTING ASSEMBLY WITH FILAMENT FEED

[75] Inventor: Gary R. Oberg, Spirit Lake, Iowa

[73] Assignee: The Toro Company, Minneapolis, Minn.

[21] Appl. No.: 877,248

[22] Filed: Feb. 13, 1978

Related U.S. Application Data

[63] Continuation of Ser. No. 733,286, Oct. 18, 1976, abandoned.

[51] Int. Cl.$^3$ ............................................. A01D 50/00
[52] U.S. Cl. ........................................ 30/276; 56/12.7
[58] Field of Search ................. 30/276, 347; 56/12.7, 56/295; 51/335

[56] References Cited

U.S. PATENT DOCUMENTS

| | | | |
|---|---|---|---|
| 2,709,323 | 5/1955 | Swan | 51/335 |
| 2,771,721 | 11/1956 | Reiman | 51/335 |
| 2,854,798 | 10/1958 | DeHaven | 51/335 |
| 3,664,102 | 5/1972 | Reber | 56/295 |
| 3,928,911 | 12/1975 | Pittinger | 30/276 |
| 4,134,204 | 1/1979 | Perdue | 30/276 |
| 4,211,005 | 7/1980 | Woods | 30/276 |

Primary Examiner—Jimmy C. Peters
Attorney, Agent, or Firm—Merchant & Gould

[57] ABSTRACT

A rotary cutting assembly with an automatic filament feed. The assembly includes a driven member which is coupled to a drive source and contains a storage spool for the cutting line. The line or filament is automatically advanced from the spool upon displacement of the same through engagement of a ground engaging hub with a surface. Such displacement causes operation of a ratchet means mounted in part on the movable spool or associated therewith and in part on the driven member to permit a limited rotary displacement of the spool within the driven member during rotation of the driven member.

13 Claims, 5 Drawing Figures

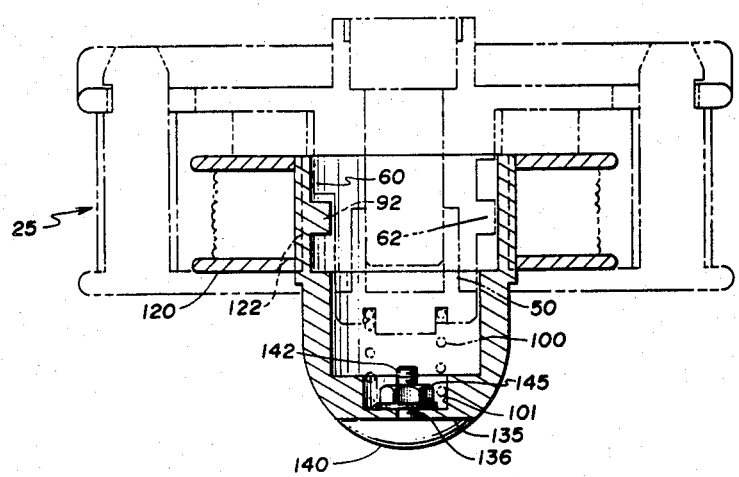
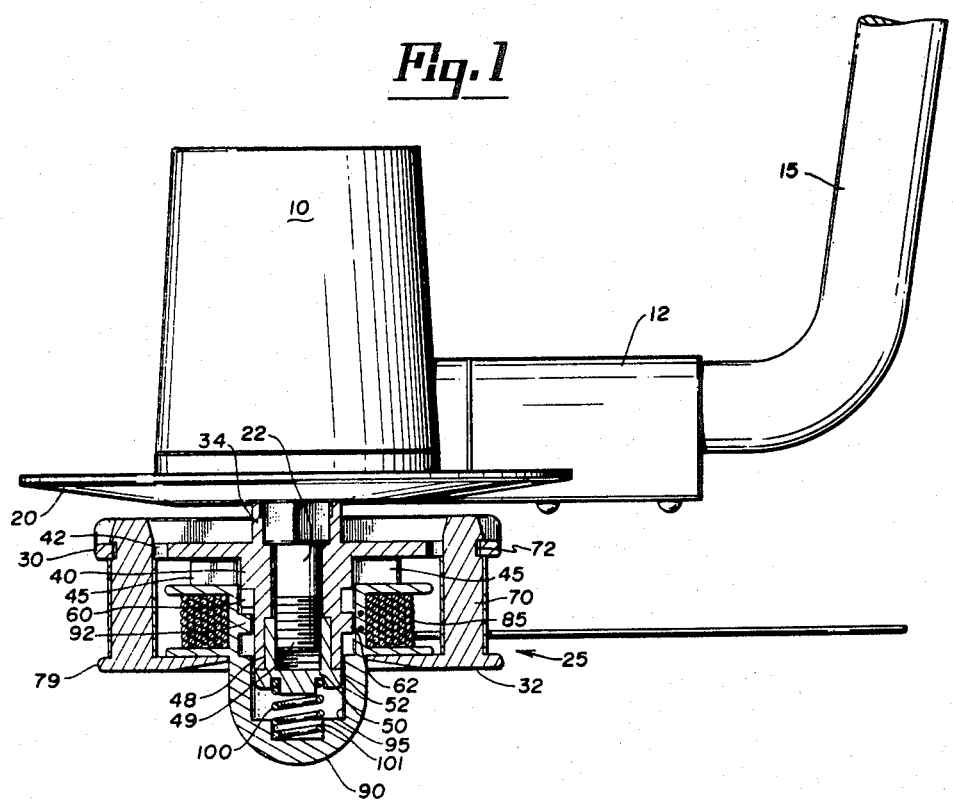

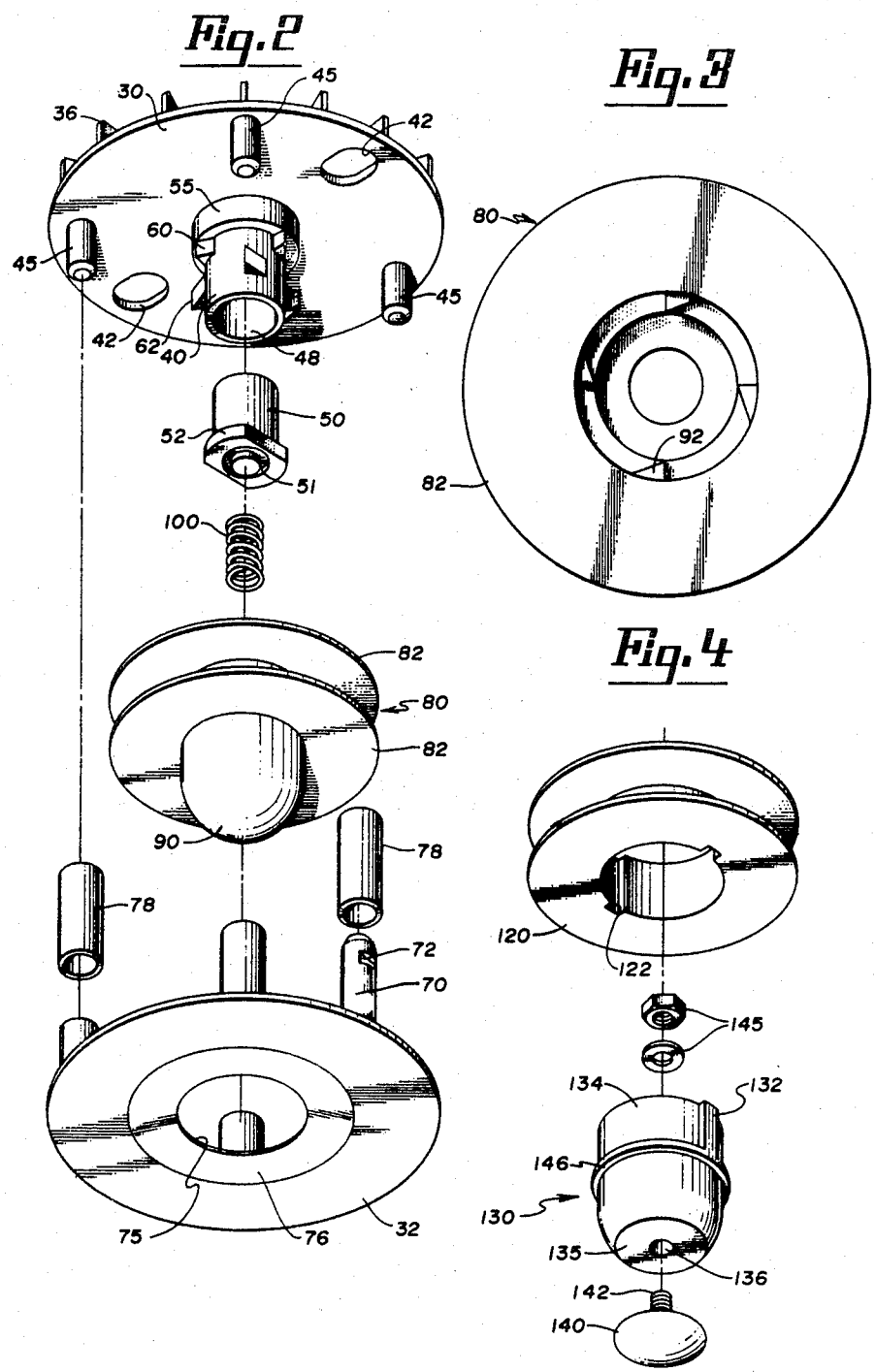

ROTARY CUTTING ASSEMBLY WITH FILAMENT FEED

This is a continuation of application Ser. No. 733,286, filed Oct. 18, 1976, now abandoned.

Our invention relates to a rotary cutting assembly utilizing a non-metallic filament as a cutting blade for cutting weeds and more particularly to an improved rotary cutting assembly of this type with an automatic filament feed.

Rotary weed cutters utilizing a filament type cutting blade or blades are old and well recognized. The patents to George C. Ballas and Thomas N. Giest, U.S. Pat. Nos. 3,708,967; 3,826,068; and 3,859,776 disclose structures of this type. In this type of rotary cutting assembly or weed cutter, a plastic filament line is mounted on a spool and rotated through a driven member to affect the cutting action. When breakage occurs through impact of the line with objects, fatigue of material, etc., it is necessary to stop the drive motor and disassemble or manipulate parts of the driven head to permit manual extension of the filament or filaments to replace the broken portion. For efficient cutting, it is necessary that a given amount of filament extend beyond the head for proper cutting operation. Attempts to automatically feed the cutting filament in a machine of this type from a storage structure have not been able to feed out a given amount of filament line to replace that which was broken off so as to maintain a desired length of filament for cutting operation. The patents to Charles B. Pittinger, Jr., U.S. Pat. Nos. 3,895,440 and 3,928,911 are examples of this type of structure. The Pittinger U.S. Pat. No. 3,895,440 discloses a filament line stored on a disc shaped filament holder and extending through apertures therein. Whenever breakage of the filament occurs in this type of structure it is necessary that the breakage occur near the aperture in the disc in order to permit centrifugal force of the rotating disc to draw that section of filament line between the breakage point and the next adjacent hole in which the line is directed to provide a new cutting segment. A sharp bend is placed in the line, and the fact that breakage must occur at or near the drive disc provides a structure which is unsatisfactory for automatic feed and accurate filament feed. Further, the sharp bend placed in the filament in mounting the same on the disc enhances breakage of the filament. The Pittinger U.S. Pat. No. 3,928,911 shows a HOLLOW-SHAFT FEED FILAMENT TRIMMER in which filament is fed by centrifugal force through a hollow shaft to a bell shaped rotary member which positions the line in a cutting position. The line is fed through a catch which is operated through a linkage and there is no control over a predetermined amount of line being fed out in the event of line breakage. Further, the supporting structure for the line in the cutting operation does not provide positive positioning support for efficient cutting.

The present invention provides a rotary cutting assembly having a driven member rotatable in a cutting plane about a drive axis and with a concentrically located spool storage area therein. The driven member is formed of a pair of parts which are readily separable to insert and remove the spool mounting the cutting line. Appropriate ratchet means are included on a part of the driven member and on part of the spool, and spacing is provided within the driven member to allow for axial displacement of the spool to engage and disengage the ratchet means. A ground engaging hub is associated with the spool, and whenever it is desired to automatically extend a cutting line from the spool, the ground engaging hub is pressed against a surface to displace the spool and disengage the ratchet means allowing the spool to rotate independent of the driving member and advance a predetermined amount of line from the spool. The predetermined amount of line is determined by the spacing of teeth between the ratchet means. Suitable bias means associated with the spool and the ground engaging hub, insure that the spool will be kept in a coupled or drive position with the driven means for normal operation and will be allowed to move relative thereto in the unwinding of the filament whenever the hub displaces the spool.

It is therefore an object of the invention to provide an improved rotary cutting assembly with an automatic filament feed.

Another object of this invention is to provide a rotary cutting assembly with a simplified means for disassembling the driven member to replace the spool.

A further object of this invention is to provide in the rotary cutting assembly an improved automatic filament feed which includes an arrangement for providing a positive feed of a predetermined amount of line upon operation of the feed structure.

A still further object of this invention is to provide in a rotary cutting assembly with an automatic filament feed having a ground engaging portion thereof which when depressed will operate the automatic feed.

Another object of this invention is to provide in a rotary cutting assembly an automatic feed apparatus in which the amount of feed is determined by the number of ratchet teeth in the advance mechanism.

It is also an object of this invention to provide a rotary cutting assembly with an improved and simplified means for supporting the line in its cutting operation.

Another object of this invention is to provide a rotary cutting assembly with automatic filament feed which is simple in design and easy to use and maintain.

These and other objects of the invention will become apparent from the reading of the attached description together with the drawings wherein:

FIG. 1 is a side elevation view of a rotary cutting assembly with parts of the rotary cutting head in section;

FIG. 2 is an exploded view of the parts of the head of the rotary cutting assembly of FIG. 1;

FIG. 3 is a plan view of the spool of the rotary cutting assembly;

FIG. 4 is an exploded view of an alternate embodiment of the spool and hub portion of the rotary cutting assembly; and, FIG. 5 is a side elevation view of the rotary cutting assembly with parts in phantom and in section disclosing the details of the alternate embodiment of FIG. 4.

As shown herein in FIG. 1, the rotary cutting assembly with filament feed is normally mounted on and driven by a suitable drive unit indicated generally at 10. The drive unit may be an electric or gasoline motor, preferably electric, the housing of which is coupled through a sleeve member 12 to a suitable support handle 15 for positioning the cutting assembly in the cutting of weeds. A suitable annular bumper 20 extends from the base of the housing and a drive shaft 22 extends therefrom to mount the rotary cutting assembly which is indicated generally at 25. Ths details of the drive assembly and the support or handle structure may take varying forms and form no part of the present invention.

The rotary cutting assembly is comprised of a driven member having first and second plate members 30 and 32 respectively. Plate member 30 has a cylindrical hub 34 projecting from one surface thereof through which the drive shaft extends. This surface of the plate member has a plurality of radial fins 36 extending from the same which, upon rotation, will provide cooling for the assembly. The plate member 30 has a cylindrical hub portion 40 extending from the opposite surface with a cylindrical aperture therethrough concentric with the aperture of the hub portion 34 and receiving the extremity of the shaft 22. In addition, plate member 30, as will best be seen in the exploded view of FIG. 2, has a pair of eliptical apertures 42 therein and a plurality of posts 45 extending from the surface of the plate member opposite the radial fins. The plate member 30 is mounted on the drive unit through the shaft 22 thereof. The shaft extends through the hub 34 and into hub 40 in a recessed portion 48 therein wherein a threaded extremity 49 of the drive shaft is located. A retainer flange 50 having an internal threaded surface or threaded recess is positioned in the recessed portion 48 of the hub 40 and threaded onto the threaded extremity of the shaft with a collar portion 52 bearing against the end of the hub 40 to retain the hub and the plate member 30 on the end of the shaft.

The hub 40 has an outer peripheral surface with an annular flange portion 55 adjacent the plate member 30 which portion, as will be later noted, serves as a guide surface. The lower extremity of the hub is recessed from this guide surface and a plurality of triangular shaped teeth members 60 and 62 are distributed about the periphery of the same. Teeth members 60 are distributed along a common plane adjacent the guide surface 55 and have a height equal to the external dimension or surface of the guide surface 55 of the hub. These teeth or ratchet means are angularly spaced about the peripheral surface of the hub and the number of teeth may be varied, as will be later identified, for purposes of determining the amount of filament to be automatically fed from the storage spool within the driven member. A second set of teeth 62 are disposed in a plane parallel to and spaced from the plane of the teeth 60 and angularly distributed so that they are positioned radially in between the teeth 60 and equidistantly spaced having the same angular spacing peripherally on the hub.

The outer plate member 32, as will be seen in the exploded view of FIG. 2, has a pair of post members 70 projecting therefrom with notched surface 72 in the extremity of the same. Plate member 32 has a central aperture 75 therein with an external dished surface 76 leading to the same. The posts 45 of plate member 30 have wear sleeves 78 positioned over the same which act as spacers to space the plate member 30, 32 apart with the posts 70 having the notched extremities 72 extending through the apertures 42 in the plate member 30 and locking the same to the plate member 30. An additional locking force is achieved when the housing is rotated at high speed, due to the centrifugal force of the posts 45 and 70. The plate member 32 around the post members 70 is slightly deformable such that the notched surfaces may be moved into and out of the apertures 42 for assembly and release of the plate members. These plate members of the driven member define a spaced area therebetween in which there is positioned the spool 80 which mounts the filament cutting line 85 of the rotary cutting assembly. Although not specifically shown herein, one or more strands of line may be wound on the spool and secured to the hub of the same with the opposite extremity or extremities extending from the spool to provide the cutting surface conventional with a rotary cutting assembly of this type. Where two or more such lines are used, they will be wound in the same direction, but coming out through the posts 45 equidistantly spaced such that upon a predetermined relative rotation of the spool to the driven member, the lines will be unwound from the spool and extend out of the driven member. Except for the posts 45 and 70 the area between the plates 30 and 32 is open to expel dirt from the housing through centrifugal force. The plate 32 extends beyond the posts 45 and 70 to form a lip 79 which prevents the linne from shearing off near the posts.

As will be seen in FIGS. 1 and 2, the spool 80 is formed in a conventional manner with a pair of spaced sides 82 held together by a common hub portion and in the preferred embodiment, has a hemispherically shaped hub member 90 formed integral therewith and projecting from one side of the spool. The interior of the hub portion of the spool has a plurality of projecting triangular teeth members 92 distributed about the inner periphery of the same. The interior of the hub has a recessed shoulder portion 95 which fits over the end of the hub 40 with the retaining flange 50 thereon to be guided thereon for longitudinal movement of the spool in an axial direction relative to the hub 40. Positioned between the interior of the hub 90 and the retainer flange 50 is a spring member 100 which fits into a recessed surface 51 in the retaining flange 50 and into a recessed surface 101 in the top of the hub 90. The spring is a compression spring which will bias the hub and hence, the spool 80 formed integral therewith, relative to the hub 40 such that the surface of the spool will bear against the plate 32. However, when the hub 90 is engaged by a surface, such as by depressing the hub against a solid surface, the spring 100 will be compressed allowing the hub 90 with the spool 80 integral therewith to slide on the hub 40 through the guiding surfaces 95 and 55 on the respective hubs to permit the teeth 92 to disengage from the row of teeth 62 on the hub 40. With the driven member rotating, a relative rotation will take place between the spool 80 and the hub 40 or the parts of the driven member allowing the spool to rotate until the flat surfaces of the teeth 92 next to adjacent teeth 60 are engaged. Once the pressure on the spring is released by withdrawal of the hub 90 from the solid surface, the compression of the spring will move the spool 80 back towards the plate member 32 disengaging the teeth 92 from the teeth 60 and allowing them to engage with the teeth 62 on the hub 40. This will allow another step of relative rotation between the spool and the driven member, the purpose of which is to unwind filament line from the spool and allow the free extremity of the same to extend out of the confines of the driven member between the posts 45 or 70 to provide a longer cutting surface for the rotary cutting assembly. This will replace any portion of the cutting line which has been broken off due to wear, fatigue, or impact with solid objects in the cutting operation.

The number of teeth in the ratchet means positioned in part on the driven member and in particular on the hub 40 and in part on the spool may vary depending upon the desired amount of rotation to take place between the spool and driven member in an automatic feed of filament. For example, if the feed is to take an amount of line covered by one/half the rotation of the spool within the driven member or 180° rotation, the teeth 60 and 62 would be spaced apart 180° with the teeth 62 being spaced angularly 90° from the teeth 60. In addition, there would be two teeth 92 on the spool spaced 180° apart which will cooperate with the teeth 60 and 62 in advancing the spool a one/half turn for filament feed upon engagement of the hub and movement of the spool within the member. The number of teeth utilized for the 90° feed or the amount of line payed out by one/quarter turn rotation would be four, or one/third turn would be three teeth. Similarly, it will be recognized that the double row of teeth could be placed on the spool and the single row on the hub 40, if desired. Preferably the number of teeth will be determined by the size of the spool and the desired length of cutting line extending from the driven member for most efficient cutting. It will be recognized that one part of the ratchet assembly will have twice the number of teeth as the opposite part and the part with twice the number of teeth will have the teeth spaced in separate planes and the teeth on each plane angularly spaced equidistantly from one another.

Whenever it is desired to disassemble the driven member for replacement of the spool, the posts 70 will be deflected, releasing the notched surfaces 72 from the sides of the apertures 42 in the plate member 30 and permitting separation and removal of the plate member 32 therefrom. Thereafter, the spool 80 and the hub 90 integral therewith will be lifted off of the hub 40 and new cutting line may be mounted thereon or a replacement unit with line thereon may be inserted in its place. Thus, no separate or special tools will be required for assembly or dissasembly of the driven member for replacement of the spool or the addition of monofilament line thereon. The posts 45 and 70 also serve as a supporting surface for the free end of the line from the spool which is extended by centrifugal force upon rotation of the head directing the line out from the driven member between the posts in a conventional manner. Where a line is broken upon impact or fatigue, the user of the rotary cutting assembly while rotating need only press the entire assembly against a surface causing the hub through its contact with the surface to overcome the compression of the spring 100 and move the spool assembly out of engagement with one set of ratchet teeth and into engagement with the other. Upon lifting or releasing of the rotary cutting assembly away from the surface, the spring will return the spool assembly within the driven member and against the plate member 32 allowing another increment of rotary movement between the spool assembly and driven member to complete the advance or automatic feed of filament line from the spool through the action of centrifugal force on the line rotating the spool relative to the housing.

FIGS. 4 and 5 show an alternate embodiment of the spool construction for the rotary cutting assembly. It employs all of the other aspects of the driven member except for modification of the spool and hub associated therewith. Thus, as will be seen in FIG. 4, the spool which in indicated at 120 no longer has the ground engaging hub formed integral therewith. Rather, the spool 120 is a conventional spool configuration with notched or keyed slots 122 in the inner peripheral surface of the hub of the spool. The filament line is wound on the spool in the same manner as in the beforementioned embodiment and the ground engaging hub indicated at 130 is a separate unit having keyed surfaces 132 on the cylindrical shank portion 134 of the same which fits into the inner peripheral surface of the spool with the flanges or keys 132 fitting into the key slots 122 in the spool to drive the same.

In this embodiment, the interior surface of the ground engaging hub 130 carries the ratchet means or teeth member 92 and the hub is configured to slide on the end of the hub 40 and the annular guide section 55 thereof. Similarly, the hub 130 may carry any number of teeth to correspond with a similar double row of teeth of the same number on the hub 40 to cooperate therewith in advancing the spool the desired rotation and, hence, the desired length of feed of line therefrom. Further, the double row of teeth may be positioned on the hub 130 with the single row on the hub 40, if desired.

In addition, the ground engaging portion of the hub 130 is designed to have a flat surface 135 thereon with an aperture 136 therethrough. This will permit the mounting of a replaceable curved ground engaging tip 140 having a threaded shaft 142 formed integral therewith which will be positioned in the aperture 136 and secured to the end of the hub through a suitable nut and washer 145. This provides for a replaceable wear surface on the end of the ground engaging hub and the surface of the same is shaped to complete the hemispherical surface of the ground engaging hub. The aperture 136, as indicated in FIG. 5, extends through the recessed surface 101 of the hub such that the securing nut and washer 145 may be positioned within the compression spring 100 to secure the replaceable tip thereon.

All other aspects of this embodiment are identical with the disclosure of FIGS. 1–3 and they are shown in phantom in FIG. 5. The removable plate member 32 is secured to the fixed plate member 30 by means of the deformable posts 70 with the notches therein. The plate members 30 and 32 will similarly be spaced apart by the spacer posts 45 and spacer member 78 which provide the wear surface for the driven member and support the monofilament line extending from the spool as the cutting blade.

The operation of this embodiment is identical with respect to the embodiment of FIGS. 1–3 in that engagement of the hub 130 with a hard surface and a depression of the same will cause movement of the hub and spool 120 mounted thereon within the driven member. This movement causes the teeth 92 carried thereby to move from engagement of the teeth 62 on the hub 40 into engagement with the teeth 60 and allows relative movement between the spool and driven member through centrifugal force on the line. Upon release, the bias of the spring 100 moves the teeth 92 out of engagement with the teeth 60 and permits reengagement with the row of teeth 62 of the ratchet means with further relative movement between the spool and driven member due to centrifugal force on the line to complete the advancement of the predetermined amount of cutting line from the spool. It should be noted that the hub 130 has an annular rim 146 thereon which will rest underneath the surface of the plate member 32 and retain a ground engaging hub within the driven member. The spool 120 is keyed to the hub 130 with a slip fit and permits the spool to be carried by the hub and moved therewith. However, the spool itself may be removed from the hub and replaced without replacement of the ground engaging hub and the portion of the ratchet means within the same.

The improved rotary cutting assembly with automatic filament feed will operate with the same cutting characteristics as the prior structure of this type. It will use a plastic cutting line on the spool as the cutting blade and the parts of the assembly may be made either of a plastic or metal material. It will operate at the same drive speeds and with the same weights and sizes of monofilament line for the cutting blade as is described in the patents previously referred to. The improvements herein relate to the configuration of parts and an incorporation of an automatic feed mechanism which permits automatic extension of the line from the storage spool during operation of the rotary cutting assembly by merely depressing the entire unit against a surface capable of resisting the same. Thus, depression will displace the ground engaging hub with the spool thereon or connected thereto within the driven member to automatically advance a predetermined amount of line from the spool to replace broken sections therefrom.

Therefore, in considering this invention, it should be remembered that this disclosure is illustrative only and the scope of the invention should be determined by the appended claims.

What is claimed is:

1. A rotary cutting assembly comprising, in combination: a member rotatable about a drive axis, said member including a spool storage receptacle therein; a spool with a cutting line wound therearound, said spool located in said spool storage receptacle in either a first or a second axial location along said drive axis, said spool being rotatable with said member while in said first axial location and rotatable relative to said member and said drive axis when moved between said first axial location and said second axial location; spring means for urging said spool into said first axial location; ground engaging means for moving said spool against said spring means from said first axial location position to said second axial location when said ground engaging means is moved axially along the drive axis; and, indexing means for limiting rotation of said spool about said drive axis relative to said member when said spool is moved from said first axial location to said second axial location in response to the action of said ground engaging means to unwind a predetermined incremental length of cutting line from said spool.

2. In a filament trimmer mechanism for cutting materials including ground-growing vegetation by operationally swinging a filament free-end as a cutting length about the axis of a driveshaft and having means for storing filament positioned for resupplying said cutting length, means for deploying filament in successive increments of length from the storing means for said resupplying, and a housing and means for guiding filament, the improvement comprising:
the means for deploying including
means for bumping on the ground and feeding filament during said operation, including:
means permitting relative movement along said driveshaft axis between the means for storing and the housing in response to a said bump,
and means for releasing an increment of filament from said storing means to said cutting length in response to said relative axial movement.

3. In a mechanism as recited in claim 2, the means for releasing including means connecting the storing means and the housing in rotation at a first position of said relative movement along the driveshaft axis and for disconnecting the storing means and the housing in rotation through a limited arc at a second position of said relative movement along the driveshaft axis.

4. In a mechanism as recited in claim 3, the first position being a position with the storing means having a first spacing along the driveshaft axis relative to the housing, the second position being a position with the storing means having a second spacing along the driveshaft axis lesser than the first spacing relative to the housing, and means biasing the storing means and housing.

5. In a mechanism as recited in claim 4, the storing means comprising a spool; the housing including a portion defining an aperture with said cutting length passing therethrough, said portion extending downward past part of the spool and comprising the guiding means.

6. In a mechanism as recited in claim 5, the means for bumping further including a lower end of the spool extending downward as the bottom of said mechanism for contacting the groun in said bumping.

7. In a filament trimmer mechanism for trimming vegetation including a ground-growing vegetation, and having means for storing filament including a spool, and means for swinging about a drive axis an end of the filament as a cutting length including filament guiding means, the improvement comprising:
means for bumping upon the ground and feeding filament comprising: the spool protrusive as the lower end of said filament trimmer mechanism, means permitting axial movement of the spool along the drive axis upon said bumping upon the ground, means releasing the spool for limited rotation relative to the drive axis upon said axial movement, and means for biasing the spool in direction opposite said axial movement and preventing feeding of filament at other times than during said bumping.

8. A spool for use in a weed cutting apparatus having a driven member containing a spool mounting opening and having first abutment means thereon, comprising a spool member for mounting flexible cutting line,
(a) said spool member being formed with a central hub having spaced circular side plates formed integral therewith and extending therefrom with an aperture through the hub;
(b) said spool member including second abutment means arranged for engagement with said first abutment means when said spool member is mounted in the driven member opening; and
(c) ground engaging means projecting from one side plate of said spool member, said ground engaging means being adapted to project out of the driven member when the spool member is mounted thereon and upon engagement with a surface to move the spool and release engagement of the first abutment means of the driven member from the second abutment means of the spool member.

9. The spool for use in a weed cutting apparatus of claim 8 in which the spool member has flexible plastic line mounted thereon and secured at one end to the spool member with the free end of the line projecting from the driven member.

10. The spool for use in weed cutting apparatus of claim 8 in which the abutment means on the spool member is formed with a plurality of equidistantly angularly spaced abutments lying in the same plane.

11. A spool as defined in claim 8 wherein one of said driven and spool members includes third abutment means axially spaced from, and angularly arranged relative to, the other abutment means on said one member, said third abutment means being so arranged that when the spool member is displaced upon engagement with the surface, the spool member is angularly displaced relative to the driven member to a position in which the third abutment means engage one of the first and second abutment means, thereby to dispense an increment of flexible cutting line from the spool member.

12. A spool for use in a weed cutting apparatus having a driven member containing a spool mounting opening and having first projection means thereon, comprising a spool member for mounting flexible cutting line,
   (a) said spool member being formed with a central hub having spaced circular side plates formed integral therewith and extending therefrom with an aperture through the hub;
   (b) said spool member including second projection means arranged for engagement with said first projection means when said spool member is mounted in the driven member opening; and
   (c) ground engaging means projecting from one side plate of said spool member, said ground engaging means being adapted to project out of driven member when the spool member is mounted thereon and upon engagement with a surface to move the spool member and release engagement of the first projection means of the driven member from the second projection means of the spool member.

13. A spool as defined in claim 12, wherein one of said driven and spool members includes third projection means axially spaced from, and angularly arranged relative, to other projection means on said one member, said third projection means being so arranged that when the spool member is displaced upon engagement with the surface, the spool member is angularly displaced relative to the driven member to a position in which the third projection means engage one of the first and second projection means, thereby to dispense an increment of flexible cutting line from the spool member.

* * * * *